INVENTOR.
JOHN C. REED 3,126,543
METHOD AND RADAR SYSTEM FOR ELIMINATING INTERFERING GROUND SIGNALS
John C. Reed, Santa Barbara, Calif., assignor to the United States of America as represented by the Secretary of the Air Force
Filed Mar. 17, 1961, Ser. No. 96,617
5 Claims. (Cl. 343—17.1)
(Granted under Title 35, U.S. Code (1952), sec. 266)

The invention described herein may be manufactured and used by or for the United States Government for governmental purposes without payment to me of any royalty thereon.

The present invention relates to a radar system, and more particularly, to a radar system wherein desired targets may be clearly identified in the presence of interfering ground return signals.

In a normal radar presentation, there will be displayed on a receiving apparatus the signals reflected by ground objects as well as the desired targets. The ground return signals known as ground clutter, at times are of such nature as to suppress the desired targets. Therefore, it is highly desirable to utilize methods of discriminating against ground clutter as related to the desired targets.

The normal method of operating a radar system is to set the elevation antenna pattern slightly above the horizon such that the horizon return signals are down about 3 db in amplitude from their maximum values. In typical locations, interfering ground return signals will be visible for about twenty to fifty miles. In the present invention, a low receiving antenna beam is established that essentially looks at the ground return interference. The information from the aforementioned low beam is then used to cancel the ground return interference signals introduced by the normal radar beam. The low beam received informational signal is gated on only during the ground return interference period, thereby maintaining the normal radar performance at the longer ranges.

An object of the present invention is to provide a radar system and method wherein desired targets are clearly distinguishable in the presence of interfering ground return signals.

Another object of the present invention is to provide a radar system wherein a separate low receiving beam is established that essentially receives interfering ground return signals and wherein said received interfering signals are utilized to cancel the interfering ground return signals received by way of the normal radar beam.

Yet another object of the present invention is to provide a radar system having one receiver accepting information from the normal radar beam and another receiver accepting information from a low receiving beam wherein the receiver for the low receiving beam essentially receives interfering ground return signals only during preselected periods and such low beam interfering ground return signals are utilized to cancel the interfering ground return signals received by way of the normal radar beam.

The novel features that I consider characteristic of my invention are set forth with particularity in the appended claims. The invention itself, however, both as to its organization and its method of operation, together with additional objects and advantages thereof, will be understood from the following description of specific embodiments thereof when read in connection with the accompanying drawings, in which:

Figure 2:
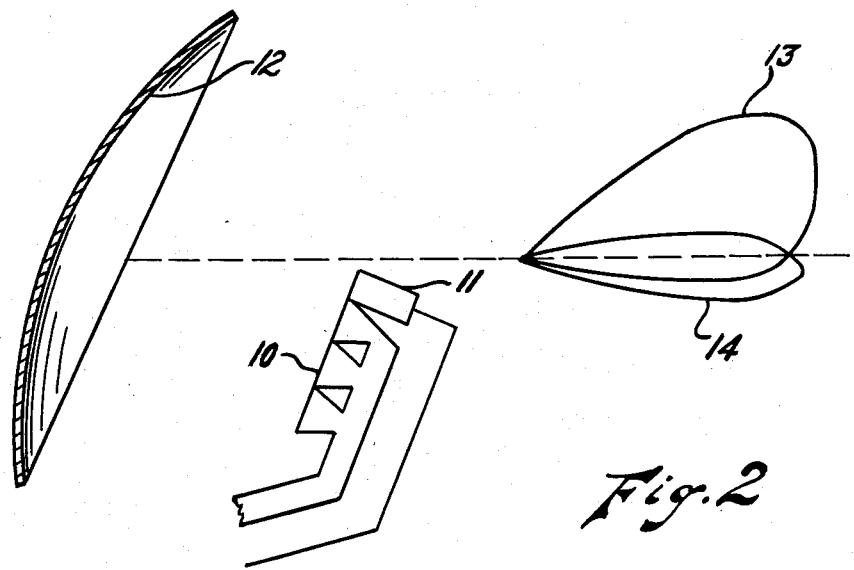
FIGURE 2 is a diagram showing the antenna receiving portion of my system and the receiving patterns of the low and normal beams resulting therefrom.

Now referring to FIGURE 2, the normal or main beam of the radar system is formed by multiple horn feed 10 together with cut parabolic reflector 12 resulting in cosec.$^2$ beam 13. As in conventional radar system operation, cosec.$^2$ beam 13 is utilized for both transmitting and receiving. An additional low receiving beam 14 is established by single aperture horn feed 11 being positioned above multiple horn feed 10. Single aperture horn feed 11 is set close enough to multiple horn feed 10 so that there is approximately a 1.5 db (one way) crossover of aforesaid two beams. This conforms with the normal or conventional 3 db (two way) horizon setting of a radar antenna. Low beam 14 is utilized solely for reception purposes whereas beam 13 is utilized both for transmitting and receiving.

Figure 1:
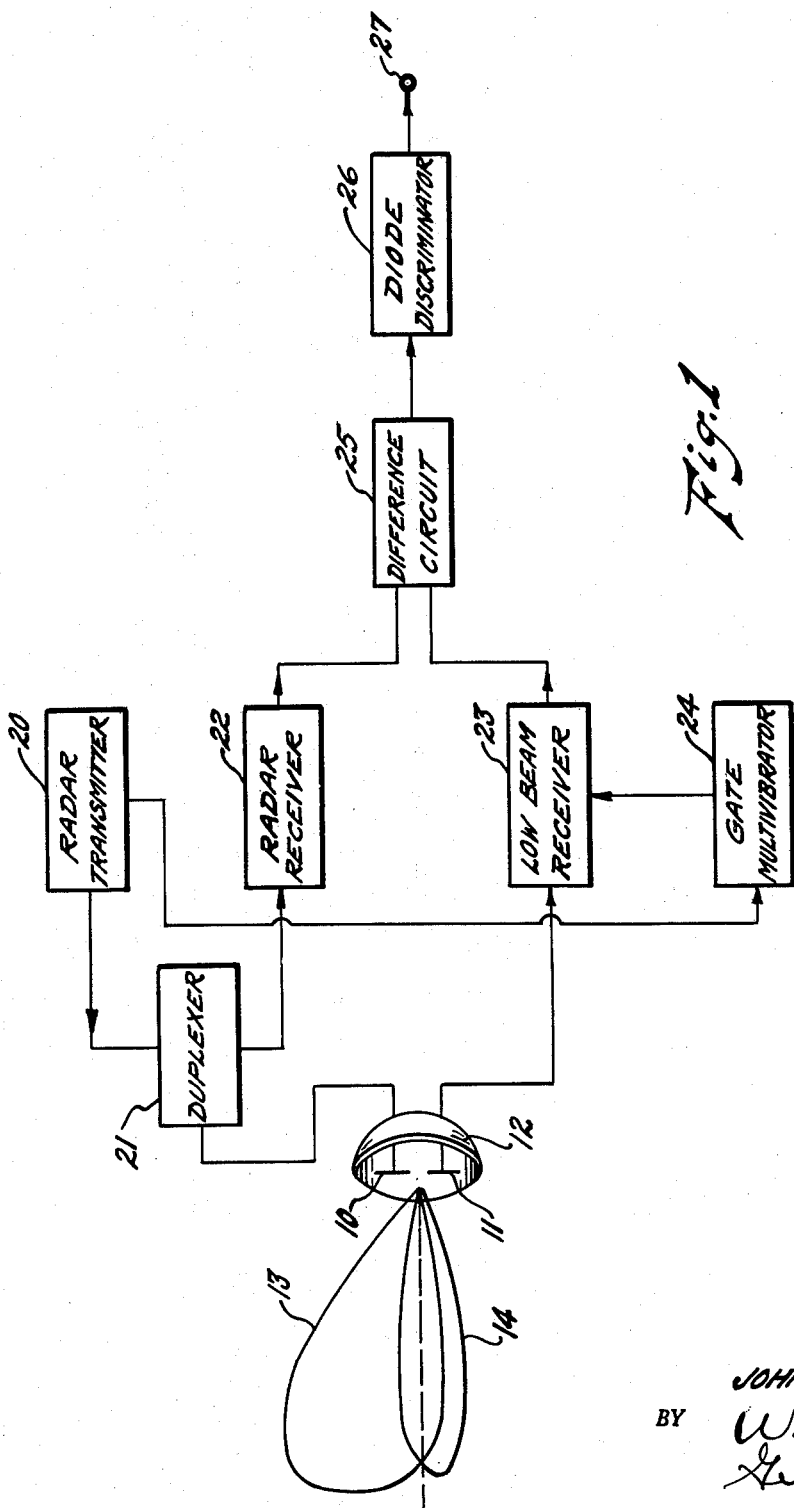
FIGURE 1 is a system in block diagram form of the preferred embodiment of my invention.

Now referring in detail to FIGURE 1, there is shown transmitter 20 which transmits radio frequency energy by way of duplexer 21 to multiple horn 10 which directs the radio energy into parabolic reflector 12. Parabolic reflector 12 then transmits the radio energy in the pattern of cosec.$^2$ beam 13. The radio energy is then reflected back by various objects such as flying targets and also by the ground and other stationary objects on the ground. This reflected energy is intercepted by parabolic reflector 12 and is then directed into multiple horn 10 to receiver 22 by way of duplexer 21. Simultaneously, any reflected energy occurring within the pattern of low receiving beam 14 is directed to low beam receiver 23 by way of parabolic reflector 12 and horn 11. It is to be noted that radar receivers 22 and 23 have identical reception characteristics but for one difference, namely, low beam receiver 23 is gated.

As previously described, interference is caused by radio frequency energy being reflected by the ground. This ground interference, for typical radar locations, exists for about 20 to 50 miles from the radar transmitter. Therefore, low beam receiver 23 is gated on during ground interference periods, thereby in no way affecting the radar performance at the target ranges. The aforementioned gating is accomplished by adjusting receiver 23 to be normally off. Gate multivibrator 24 is triggered by a pulse from transmitter 20. The triggering pulse actuates gate multivibrator 24 which then generates a pulse of predetermined width (as related to the aforementioned ground interference period). The generated pulse, as illustrated at (c) of FIGURE 3, then turns on receiver 23. Thus, signals resulting from ground reflections at preselected ranges are amplified by low beam receiver 23.

Figure 3:
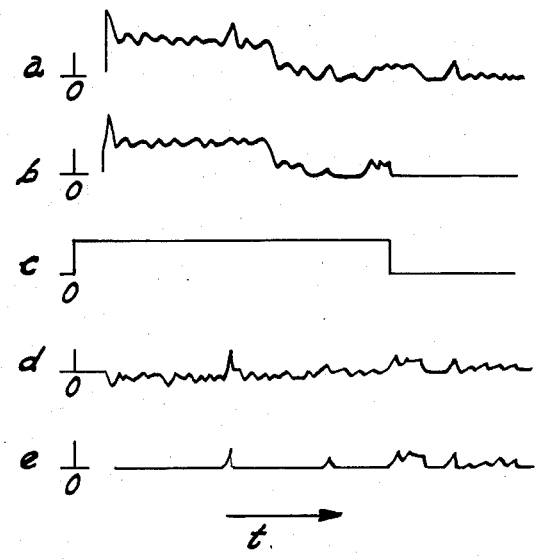
FIGURE 3 shows the waveforms present at various significant points of FIGURE 1.

The significant waveform of the output signal of receiver 22 is illustrated at (a) of FIGURE 3. It is in the form of video and is representative of ground clutter and targets within the area of cosec.$^2$ beam 13. The output signal from gated low beam receiver 23 is illustrated at (b) of FIGURE 3. This is also in the form of video and is representative of ground clutter and weaker targets within the area of low receiving beam 14.

The output video signals from receivers 22 and 23, respectively, are compared in difference circuit 25 and the output video signal therefrom is illustrated at (d) of FIGURE 3. It is to be noted that the signal representative of the ground clutter has been cancelled and only peaks representative of targets remain. The difference video signal is passed through diode discriminator 26 which passes the positive signals, rejecting the negative. The signals representative of targets are available at output terminal 27. The output signals from diode discriminator 26 are illustrated at (e) of FIGURE 3.

Receivers 22 and 23 may also be used in combination with difference circuit 25 to determine when a target is above the crossover of beams 13 and 14, respectively. This is accomplished by comparing the signal amplitudes from a given target as received by receivers 22 and 23, respectively. If the target signal is stronger in amplitude in low beam receiver 23, difference circuit 25 is adjusted so that this information is rejected and no output signal from difference circuit 25 is available. However, if the target signals in receiver 22 are larger in amplitude than target signals in receiver 23, the target signals from receiver 22 are retained at the output of difference circuit 25. Since ground clutter is below the crossover of beams 13 and 14, respectively, it will be stronger in the low beam receiver and thus be rejected by difference circuit 25. Receivers 22 and 23 are designed with a wide dynamic range.

While, in accordance with the provisions of the statutes, I have illustrated and described the best form of the invention now known to me, it will be apparent to those skilled in the art that changes may be made in the form of the system disclosed without departing from the spirit of the invention as set forth in the appended claims, and that in some cases certain features of the invention may sometimes be used to advantage without a corresponding use of other features.

Having now described my invention, what I claim as new and desire to secure by Letters Patent, is as follows:

1. A radar system comprising a first antenna having a first preselected beam pattern, said first antenna transmitting radio frequency energy generated by an associated transmitter and receiving reflected signals after said transmission, a second antenna utilized solely for reception and having a second preselected beam pattern, said second antenna positioned so that said second beam pattern has a preselected crossover with said first beam pattern, first means to receive reflected signals in said first beam pattern of said first antenna, second means to receive reflected signals in said second beam pattern of said second antenna, means to switch on said second receiver means for a preselected period, means to compare the output signals from said first and second receiver means to each other, and diode discriminator means passing the resultant signal of said comparison operation.

2. A radar system comprising first means to establish a first preselected pattern for transmission and reception of radio frequency energy, second means to establish a second preselected receiving pattern for said radio frequency energy, said first and second preselected patterns having a preselected crossover, first means to receive reflected radio frequency energy within said first preselected pattern, second means to receive reflected radio frequency energy within said second preselected pattern, said second receiving means being gated on for a preselected period, means to compare the output signal from said first receiving means to the output signal of said second receiving means to obtain a difference signal, and a diode discriminator passing said difference signal.

3. A radar system to eliminate ground interference signals comprising first means to establish a first preselected common transmission and receiving pattern for radio frequency energy, second means to establish a second preselected pattern for receiving the reflections of said radio frequency energy, said first preselected pattern having a preselected crossover with said second preselected pattern, first means for receiving reflections of said radio frequency energy within said first pattern, second means to receive reflections of said radio frequency energy within said second pattern, said second receiving means being gated on only during periods of said ground interference signals, means to compare the output signal of said first receiving means to the output signal of said second receiving means to obtain a difference signal, and diode discriminator means passing said difference signal.

4. A radar system to eliminate ground interference signals comprising first means to receive reflections of radio frequency energy within a first preselected area, second means to receive reflections of radio frequency energy within a second preselected area during periods of said ground interference signals, said first and second area having a predetermined relationship, means to compare the output signal from said first receiving means to the output signal of said second receiving means to obtain a difference signal, and diode discriminator means passing said difference signal.

5. A radar system for eliminating ground interference signals from radar signals comprising first means to receive said radar signals within a first preselected area, second means to receive said ground interference signals within a preselected second area, said first area having a predetermined crossover with said second area, means to compare the output signal of said first receiving means to the output signal of said second receiving means during periods of said ground interference signals to obtain a difference signal, and diode discriminator means passing said difference signal.

References Cited in the file of this patent
UNITED STATES PATENTS

| | | |
|---|---|---|
| 2,659,081 | Allen | Nov. 10, 1953 |
| 2,682,048 | Longacre | June 22, 1954 |
| 2,994,080 | Varela | July 25, 1961 |